(12) United States Patent
    Anderson

(10) Patent No.: US 11,115,604 B2
(45) Date of Patent: Sep. 7, 2021

(54) CAMERA APPARATUS FOR GENERATING MACHINE VISION DATA AND RELATED METHODS

(71) Applicant: Insitu, Inc., Bingen, WA (US)

(72) Inventor: David Elliott Anderson, White Salmon, WA (US)

(73) Assignee: INSITU, INC., Bingen, WA (US)

( * ) Notice: Subject to any disclaimer, the term of this patent is extended or adjusted under 35 U.S.C. 154(b) by 0 days.

(21) Appl. No.: 16/161,786

(22) Filed: Oct. 16, 2018

(65) Prior Publication Data

US 2019/0208135 A1      Jul. 4, 2019

Related U.S. Application Data

(60) Provisional application No. 62/613,046, filed on Jan. 2, 2018.

(51) Int. Cl.
| | |
|---|---|
| *H04N 5/247* | (2006.01) |
| *H04N 5/225* | (2006.01) |
| *H04N 7/18* | (2006.01) |
| *G06K 9/00* | (2006.01) |

(Continued)

(52) U.S. Cl.
CPC ......... *H04N 5/247* (2013.01); *G06K 9/00771* (2013.01); *G06K 9/209* (2013.01);
(Continued)

(58) Field of Classification Search
CPC ......... G01C 11/00; G01C 11/02; G01C 11/36; G01C 11/025; G05D 1/0038;
(Continued)

(56) References Cited

U.S. PATENT DOCUMENTS

| 7,581,702 B2 | 9/2009 | Olson et al. |
| 7,876,359 B2 | 1/2011 | von Flotow et al. |

(Continued)

OTHER PUBLICATIONS

Nagahara et al., "Dual-Sensor Camera for Acquiring Image Sequences with Different Spatio-temporal Resolution," Proceedings of the IEEE Conference on Advanced Video and Signal Based Surveillance, Sep. 2005, pp. 450-455, 6 pages.

(Continued)

*Primary Examiner* — Joon Kwon
(74) *Attorney, Agent, or Firm* — Hanley, Flight & Zimmerman, LLC

(57) ABSTRACT

Example camera apparatus for generating machine vision data and related methods are disclosed herein. An example apparatus disclosed herein includes a first camera coupled to a movable turret and a second camera coupled to the movable turret. The first camera and the second camera are co-bore sighted. The first camera and the second camera are to generate image data of an environment. The example apparatus includes a processor in communication with at least one of the first camera or the second camera. The processor is to generate a first image data feed and a second image data feed based on the image data. The first image data feed includes a first image data feature and the second image data feed includes a second image data feature different than the first image data feature. The processor is to transmit the second image data feed for analysis by a machine vision analyzer.

20 Claims, 9 Drawing Sheets

(51) Int. Cl.
*G06K 9/20* (2006.01)
*G08B 13/196* (2006.01)

(52) U.S. Cl.
CPC ..... *G08B 13/19643* (2013.01); *H04N 5/2253* (2013.01); *H04N 7/181* (2013.01)

(58) Field of Classification Search
CPC ....... G05D 1/0022; G06T 11/00; G06T 11/60; G06T 17/05; G06T 19/006; G06T 1/20; G06T 2200/24; G06T 2207/10016; G06T 2207/20056; G06T 2207/20076; G06T 2207/20104; G06T 2207/30241; G06T 7/246; G06T 7/277; H04N 5/33; H04N 7/183; H04N 5/2254; H04N 5/2256; H04N 5/2259; H04N 5/23219; H04N 5/23248; H04N 5/23251; H04N 5/23264; H04N 5/247; H04N 7/181; B64C 2201/146; B64C 39/024; G02B 27/646; G03B 15/006; G06K 9/00255; G06K 9/00744; G06K 9/00771; G06K 9/209; G06K 9/3241; G06K 9/4652; G08G 5/0013; G08G 5/0069; G08G 5/0082; H04B 7/18504; H04W 4/046; H04W 4/70
See application file for complete search history.

(56) References Cited

U.S. PATENT DOCUMENTS

| | | | |
|---|---|---|---|
| 8,615,105 B1 | 12/2013 | Cheng et al. | |
| 9,373,051 B2 | 6/2016 | Viviani | |
| 9,380,275 B2 | 6/2016 | Davidson, Jr. et al. | |
| 2003/0193577 A1* | 10/2003 | Doring | G08B 13/19634 348/211.99 |
| 2006/0028548 A1* | 2/2006 | Salivar | G08B 13/19643 348/143 |
| 2008/0143821 A1* | 6/2008 | Hung | G06T 3/0062 348/36 |
| 2011/0063446 A1 | 3/2011 | McMordie et al. | |
| 2011/0157367 A1 | 6/2011 | Chang | |
| 2012/0027093 A1* | 2/2012 | Amon | H04N 7/152 375/240.16 |
| 2014/0132735 A1* | 5/2014 | Lee | H04N 5/23238 348/47 |
| 2016/0205355 A1* | 7/2016 | Warzelhan | H04N 7/183 348/158 |
| 2016/0335484 A1* | 11/2016 | Xie | G06K 9/00335 |
| 2016/0344980 A1 | 11/2016 | Davidson, Jr. et al. | |
| 2020/0053292 A1 | 2/2020 | Janjic et al. | |
| 2020/0366854 A1* | 11/2020 | Numata | H04N 5/247 |

OTHER PUBLICATIONS

European Patent Office, "Search Report," issued in connection with European Patent Application No. 18215889.9, dated Apr. 18, 2019, 9 pages.

European Patent Office, "Examination Report," issued in connection with European Patent Application No. 18215889.9, dated Jul. 12, 2021, 6 pages.

* cited by examiner

CAMERA APPARATUS FOR GENERATING MACHINE VISION DATA AND RELATED METHODS

RELATED APPLICATION

This patent claims priority to U.S. Provisional Patent Application Ser. No. 62/613,046, which was filed on Jan. 2, 2018, and is hereby incorporated herein by reference in its entirety.

FIELD OF THE DISCLOSURE

This disclosure relates generally to cameras and, more particularly, to camera apparatus for generating machine vision data and related methods.

BACKGROUND

Image surveillance is performed by government, military, business, and civilian entities as part of, for instance, providing security and/or monitoring efforts with respect to individuals, places, or objects (e.g., vehicles) of interest. Image surveillance can be performed using one or more cameras to generate image data (e.g., still image data and/or video) that are analyzed with respect to the subject matter of interest.

SUMMARY

An example apparatus includes a first camera coupled to a movable turret and a second camera coupled to the movable turret. The first camera and the second camera are co-bore sighted. The first camera and the second camera are to generate image data of an environment. The example apparatus includes a processor in communication with at least one of the first camera or the second camera. The processor is to generate a first image data feed based on the image data and a second image data feed based on the image data. The first image data feed includes a first image data feature and the second image data feed includes a second image data feature different than the first image data feature. The processor is to transmit the second image data feed for analysis by a machine vision analyzer.

Another example apparatus disclosed herein includes a data sampler to sample image data generated by a camera for an environment and generate a first image data feed and a second image data feed based on the sampling. The first image data feed includes a first image data feature and the second image data feed includes a second image data feature different than the first image data feature. The example apparatus includes a communicator to selectively transmit the first image data feed to first analysis means and the second image data feed to second analysis means.

Another example apparatus disclosed herein includes an image manager to generate a first image data feed based on image data generated by a camera for an environment and a second image data feed based on the image data. The first image data feed includes a first image data feature and the second image data feed includes a second image data feature different than the first image data feature. The image manager is to output the first image data feed via first communication channel and the second data feed via a second communication channel. The example apparatus includes a machine vision analyzer to identify subject matter in the environment based on a feature identification rule and the second image data feed.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1:
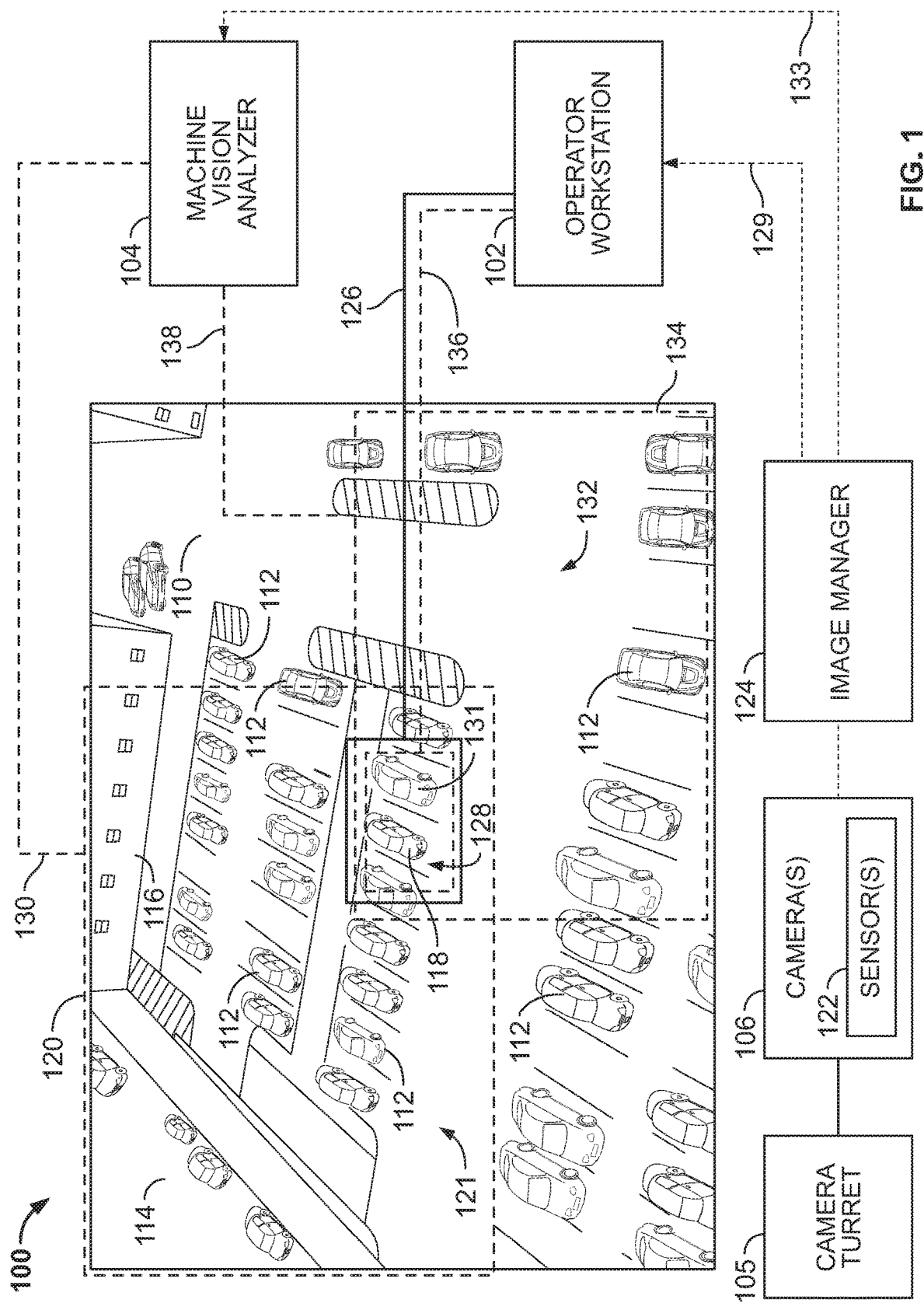
FIG. 1 illustrates an example system including one or more cameras for generating image data of an environment, an image manager for selectively generating image data feeds based on the image data, and a machine vision analyzer to analyze the data feeds in accordance with teachings disclosed herein.

Image surveillance is performed by government, military, business, and civilian entities as part of, for instance, providing security and/or monitoring efforts with respect to individuals, places, or objects (e.g., vehicles) of interest. Image surveillance can be performed using one or more cameras to generate image data (e.g., still image and/or video) that are analyzed with respect to the subject matter of interest. For example, one or more cameras can be mounted at a fixed location of a building, such as an exterior building wall, a tower, a window, an interior hallway, etc., and/or at a location proximate to the building, such as a pole exterior the building. Camera(s) can be mounted to transportation vehicles such as trucks, automobiles, boats, etc. to provide for surveillance of moving persons or vehicles or interest. In some examples, one or more cameras are coupled to aerial platforms such as a helicopter, a vertical take-off and landing (VTOL) aircraft, a fixed wing aircraft, a drone, etc. Also, in some examples, camera(s) can be mounted to satellites or other orbital vehicles. Thus, image data can be collected from cameras supported by a variety of platforms. In some examples, image data is generated for subject matter of interest (e.g., person(s), object(s), or location(s) under surveillance) using camera(s) that capture images from different fields of view, zoom levels, frame sizes, etc. and/or generate different types of image data, such as motion video and still images. For example, a turret camera can rotate to generate image data of an environment from different fields of view.

Image data generated by camera(s) for surveillance purposes can be transmitted to a human operator for analysis with respect to monitoring and/or detection of the subject matter of interest in the image data. However, surveillance camera(s) typically generate large amounts of image data over a surveillance period, which can last hours or days. Due to limitations with respect to computing resources such as storage capabilities, bandwidth transmissions, etc. as well as limitations with respect to the capability of the human operator to review all of the image data, the operator typically receives image data having a smaller sized field of view than is captured by the camera(s) at the source and/or image data having lower quality than is generated by the camera(s) (e.g., lower resolution image data, compressed imaged data, cropped image data). Thus, at least some portion of the image data is not provided to the operator as generated by the camera(s), which can result in missed opportunities with respect to identification of the subject matter of interest based on the image data.

Machine vision technology provides for automated extraction of information from image data. Machine vision technology can analyze image data at higher resolutions, additional wavelengths of light, and/or faster speeds than a human operator. Further, machine vision technology can analyze image data using sensing techniques such as synthetic aperture radar, light ranging scanning, sound-based sensing, sonar, etc. By implementing, instance, predefined rules such as facial recognition and/or object recognition rules, machine vision technology can be used for automated inspection and identification of subject matter of interest.

Disclosed herein are example camera apparatus and methods that enable machine vision technology to be used to complement analysis of image data by a human operator to provide for a more complete analysis of the image data than would performed by the human operator alone. In examples disclosed herein, a camera such as a turret camera, which can include two or more co-bore sighted cameras mounted to the turret, generate image data for subject matter of interest, such as a target under surveillance. Example camera(s) selectively transmit a portion of the image data for analysis by, for instance, a user (e.g., a human operator). The image data transmitted for analysis by the user can include, for example, standard definition image data (e.g., 640×480 pixels), compressed data image, cropped image data, etc. The image data transmitted to the user can include the subject matter of interest, such as images of a doorway of a building where a person of interest is expected to appear. Example camera(s) disclosed herein transmit a second portion of the image data for automated, autonomous analysis by a machine vision analyzer (e.g., a computer) using feature identification rules and machine vision algorithms. The portion of the image data provided to the machine vision analyzer can include raw image data, higher resolution image data, image data collected at different zoom levels, image data capturing different field(s) of view of an environment than the data sent to the user, image data having a different format than the data sent to user (e.g., video versus still image data), etc. For instance, the image data provided to the machine vision analyzer can include data corresponding to a larger frame that includes the doorway in which the person of interest is expected to appear as well as a neighboring building. The machine vision analyzer can analyze the frame to detect if the person of interest appears at the neighboring building based on facial recognition rules. Thus, examples disclosed herein provide for enhanced image analysis that enables the large amounts of image data generated by the camera(s) to be efficiently analyzed.

In some examples disclosed herein, a camera such as a turret camera captures image data of a target, such as a location where a person is expected to arrive, based on user-defined instructions to generate image data for the target. The turret camera can move (e.g., rotate, pan, zoom, etc.) based on a user-defined search pattern to generate image data that includes additional fields of view, while continuing to generate image data of the target by keeping the target in the frame. The data generated by the camera is sampled such that the image data of the target is transmitted to the user while the image data corresponding to the additional fields of view are transmitted to the machine vision analyzer for automated image analysis. In some examples, the image data transmitted to the machine vision analyzer has a higher resolution than the image data transmitted to the user, thereby improving an accuracy with which the subject matter of interest is analyzed.

In some examples, a turret camera includes two or more co-boresighted cameras coupled to a turret to generate image data for the subject matter of interest. In such examples, a first camera captures image data of the subject matter of interest, such as a target vehicle under surveillance. The first camera can capture the image data as low resolution video data for transmission the user. The other camera(s) can capture different portions of the environment. In some examples, the lens and/or mirrors of the other camera(s) are co-boresighted with the first camera to capture images of one or more portions the environment with different image data features, such as different zoom levels, different light wavelength images, different pixel resolutions or sensitivities, different video stream formats, different image types (e.g. still images), etc. as compared to the first camera. The image data generated by the other camera(s) is transmitted to the machine vision analyzer for automated feature identification analysis. Example disclosed herein can alleviate efforts by a human operator with respect to attempting to analyze all of the image data collected over the surveillance period or having to discriminately choose which image data to analyze. Further, examples disclosed herein increase opportunities for monitoring and/or detecting subject matter of interest in the image data through automated machine vision analysis. Thus, example disclosed herein provide for improved image data analysis by generating image data feeds including different image features and providing the image data feeds for complementary analysis by a user and a machine vision analyzer. In the context of surveillance image analysis, the generation of multiple image data feeds with different image feature for analysis by the user and the machine vision analyzer provides for improvements in identifying and/or monitoring point(s) of interest in view of the large amount of image data gathered over surveillance period(s).

Although examples disclosed herein are discussed with respect to surveillance, teachings disclosed herein can be utilized in other applications such as navigation. As such, the discussion of surveillance is for illustrative purposes only and does not limit this disclosure to surveillance applications FIG. 1 illustrates an example system 100 constructed in the accordance with teachings of this disclosure for generating image data for analysis by a user at an operator workstation 102 (e.g., a computer) and automated analysis by a machine vision analyzer 104. The example system 100 includes one or more cameras 106 to generate image data of an environment 108. In the example of FIG. 1, the environment 108 includes a parking lot 110 including a plurality of vehicles 112, a street 114, and a building 116. The example environment 108 includes a first vehicle 118 of the plurality of vehicles 112. In the example of FIG. 1, the first vehicle 118 is an object of interest under surveillance.

The example camera(s) 106 of FIG. 1 are supported by a camera turret 105. In the example of FIG. 1, two or more of the camera(s) 106 are co-bore sighted or axially aligned with respect to an optical axis of the cameras 106. The camera turret 105 can be supported by a platform in the environment 108, such as a light post near the environment 108, a ground and/or air vehicle, a building overlooking the environment 108, etc. The example camera(s) 106 are capable of rotating via gimbal(s) of the turret 105. In some examples, the turret 105 enables the cameras 106 to be moved independently to capture the environment from different fields of view. The camera(s) 106 can include still camera(s), video camera(s), and/or a combination thereof.

In the example of FIG. 1, the operator workstation 102 is in communication with the camera(s) 106 via wired and/or wireless connection(s). The user provides one or more rules via the operator workstation defining the portion(s) of the environment 108 for which image data is to be generated by the camera(s) 106. For instance, the rules can indicate that one or more of the cameras 106 should generate image data of the environment 108 including the first vehicle 118. The rules can also define, for example, the frame rate at which the images are to be captured, the image format (e.g., still image, video), frame size, zoom level, field of view angles, etc.

In the example of FIG. 1, sensor(s) 122 of the camera(s) 106 measure and record light proportional to a brightness of the environment 108 to generate image data of the environment 108 including the first vehicle 118. The camera 106 of FIG. 1 can capture the environment 108 shown in FIG. 1 (i.e., all or substantially all of the image data of the environment 108 shown in FIG. 1) on a backplane of the camera 106. As represented in FIG. 1, image data 120 generated by camera sensor(s) 122 includes a first area 121 of the environment 108, including, for instance, a portion of the parking lot 110, the street 114, and the building 116. The image data 120 for the first area 121 of the environment 108 may be still image data or video data. The image data 120 of the first area 121 of the environment 108 captured by the camera backplane can span, for instance, 4000×3000 pixels. However, transmitting such a large image to the operator workstation 102 may not be practical in view of storage capabilities, communication bandwidth, processing capabilities, etc.

The example system 100 of FIG. 1 includes an image manager 124. The example image manager 124 can be implemented by a processor of one or more of the cameras 106. In other examples, the image manager 124 is implemented by one or more cloud-based devices, such as one more servers, processors, and/or virtual machines located remotely from the camera(s) 106. In other examples, some of the analysis performed by the image manager 124 is implemented by cloud-based devices and other parts of the analysis are implemented by local processor(s) of one or more cameras 106.

The example image manager 124 of FIG. 1 determines portion(s) of the image data 120 for the first area 121 of the environment 108 that are to be transmitted to the operator workstation 102 and causes the camera(s) 106 to transmit the portion(s) to the operator workstation 102. For instance, to efficiently transmit the image data to the operator workstation 102 (e.g., over a wireless connection), the image manager 124 sends a first image data feed 126 of the image data 120 corresponding to a portion 128 of the area 121 including the first vehicle 118 and a second vehicle 131. The image data of the first image data feed 126 can have a resolution of, for instance, 640×480 pixels (i.e., standard definition).

The first image data feed 126 is transmitted to the operator workstation 102 via a first communication channel 129 using one or more wired or wireless communication protocols. The first image data feed 126 can be stored at the operator workstation 102 for manual analysis by the user. Thus, the user manually reviews the first image data feed 126 including a portion of the image data 120 capturing the first vehicle 118 with respect to surveillance activity. Thus, manual review of the first image data feed 126 by the user serves as a first means for analyzing the image data 120. However, as illustrated in FIG. 1, the data of the first image data feed 126 includes the first vehicle 118, but does not include an image of, for instance, the street 114. If the user is looking for a person of interest in the vicinity of the first vehicle 118, there is a chance that the person of interest is, for instance, in the street 114. In that situation, because the user receives the first image data feed 126 including the first vehicle 118 but not the street 114, the user will not identify the person of interest in the environment 108.

In the example system of FIG. 1, the image manager 124 transmits a second image data feed 130 to the machine vision analyzer 104 via a second communication channel 133, which provides a second, automated means of analyzing the image data 120. In some examples, the second image data feed 130 includes the image data 120 (i.e., all or substantially all of the image data 120). In other examples, the second image data feed 130 includes at least a portion of the image data 120. In such examples, the portion of the image data 120 in the second image data feed 130 may represent an area of the environment 108 that larger than the area of the environment 108 captured in the first image data feed 126 (e.g., image data including a part of the street 114 and the parking lot 110 but not the building 116). In some other examples, the image data of the second image data feed 130 has a higher resolution than the first image data feed 126. The second image data feed 130 is transmitted to the machine vision analyzer 104 via one or more wired communication protocols. In some examples, the second image data feed 130 is transmitted to the machine vision analyzer 104 using high bandwidth communication channels, such as a fiber optic cables, in view of the large size of the data. In some examples, the image second image data feed 130 is transmitted to the machine vision analyzer 104 using a short length, high bandwidth connection such as a firewall in stances in which the machine vision analyzer is in proximity to the camera 106.

In the example of FIG. 1, the image manager 124 samples the image data 120 at different sampling intervals to generate the first and second image data feeds 126, 130. The image manager 124 can sample the image data 120 as the data is being generated by the camera(s) 106 or at a later time. For instance, the image manager 124 can alternate between sampling the first image data feed 126 for transmission to the operator workstation 102 and sampling the second image data feed 130 for transmission to the machine vision analyzer 104. The sampling rate of the first image data feed 126 (e.g., the standard definition image data) can be, for example, 30 frames per second at standard resolution (e.g., 640×480 pixels). In intervals between the sampling of the first image data feed 126, the image manager 124 samples the image data 120 to generate the second image data feed 130 for transmission to the machine vision analyzer 104, for instance, at a higher resolution (e.g., 1280×720 pixels, 4000×3000 pixels). The sampling rate of the first and second image data feeds 126, 130 can be based on user-defined rules.

The image manager 124 can transmit the first image data feed 126 to the operator workstation 102 as the image data 120 is being sampled or at a later time. Similarly, the image manager 124 can transmit the second image data feed 130 to the machine vision analyzer 104 as the image data 120 is being sampled or at a later time. The first and second image data feeds 126, 130 can be streamed periodically or aperiodically to the operator workstation 102 or the machine vision analyzer 104 as the image data 120 is sampled by the image manager 124. The respective first and second image data feeds 126, 130 can be transmitted to the operator workstation 102 and the machine vision analyzer 104 simultaneously, substantially simultaneously (e.g., within milliseconds of one another), or at different times. Also, the image manager 124 can transmit one or more of the first image data feed 126 to the operator workstation 102 or the second image data 130 to the machine analyzer 104 as the image data 120 being generated by the camera(s) 106 or at a later time. Thus, the sampling and/or streaming of the first image data feed 126 and/or the second image data feed 130 may or may not correspond to a surveillance period during which the camera(s) 106 are generating image data.

In examples in which two or more cameras 106 (e.g., co-bore sighted cameras) are used to generate the image data 120, the image manager 124 can alternate between sampling the image data generated by the respective cameras 106 for transmission to the operator workstation 102 and the machine vision analyzer 104. In some such examples, the image data generated by the cameras 106 includes different formats and/or features. For instance, a first one of the cameras 106 can generate low resolution video data corresponding to the first image data feed 126 and a second one of the cameras 106 can generate high resolution still images of the area 121 of the environment 108 that is transmitted to the machine vision analyzer 104 as the second image data feed 130.

The example machine vision analyzer 104 of FIG. 1 can be implemented via a processor of a user device. The user device can include the operator workstation 102. In some examples, the user device includes the camera(s) 106 such that the generation of the image data and the automated analysis of the image data feed is provided by the camera(s) 106. In other examples, the machine vision analyzer 104 is implemented by a user device different from the operator workstation 102 or the camera(s) 106. In some examples, the machine vision analyzer 104 is implemented by one or more cloud-based devices, such as one more servers, processors, and/or virtual machines. In other examples, some of the analysis performed by the machine vision analyzer 104 is implemented by cloud-based devices and other parts of the analysis are implemented by local processor(s) of one or more user devices.

The example machine vision analyzer 104 of FIG. 1 analyzes the second image data feed 130 based on feature identification rules and one or more machine vision algorithms to identify, for instance, a person of interest who is under surveillance. The feature identification rules can be user-defined rules based on, for instance, facial recognition analysis, object recognition analysis, etc. Thus, as compared to the first image data feed 126 analyzed by the user, the analysis of the second image data feed 130 by the machine vision analyzer 104 increases the amount of image data for the environment 108 that is analyzed with respect to a target under surveillance. In some examples, if the machine vision analyzer 104 identifies the target in the second image data feed 130, the machine vision analyzer 104 generates one or more alerts. The alerts can be provided a user as the alerts are generated or accessed at a later time (e.g., the user of the operator workstation 102, a different user) to inform the user that the target has been identified in the image data. The example machine vision analyzer 104 can analyze the second image data feed 130 when the second image data feed 130 is received by the machine vision analyzer 104 or at a later time.

The user-defined camera rules implemented by the camera(s) 106 can include search patterns to be executed in collecting the image data of the environment 108. For instance, the rules can indicate that after the camera(s) 106 generate the image data of the first area 121 of the environment 108, the camera(s) 106 are to move (e.g., rotate, pan) to collect image data for a second area 132 of the environment 108. The rules can indicate that the image data for the second area 132 is to include the first vehicle 118. As disclosed above with respect to the image data 120 for the first area 121 of the environment 108, image data 134 generated by the camera(s) 106 for the second area 132 of the environment 108 is sampled by the image manager 124. The image manager 124 transmits a first image data feed 136 of the image data 134 including the first vehicle 118 to the operator workstation 102 as, for example, standard definition image data. Thus, the operator workstation 102 continues to receive image data including the first vehicle 118 of interest after the camera(s) 106 have moved away from the field of view represented by the first area 121. The image manager 124 transmits a second image data feed 138 of the image data 134 to the machine vision analyzer 124 as, for instance, high resolution image data. The second image data feed 138 can include the image data 134 for the second area 132 of the environment 108 (i.e., all or substantially all of the image data 134) and/or a portion thereof. Thus, the example image manager 124 of FIG. 1 provides for multiple image data feeds that results in analysis of image data corresponding to different fields of views, resolution, types of image data, etc. for the environment 108. The search pattern rules can direct the camera(s) 106 to generate image data for other areas of the environment 108 (e.g., image data corresponding to the upper right corner of the environment 108 in FIG. 1, the lower left corner of the environment 108 in FIG. 1).

Figure 2:
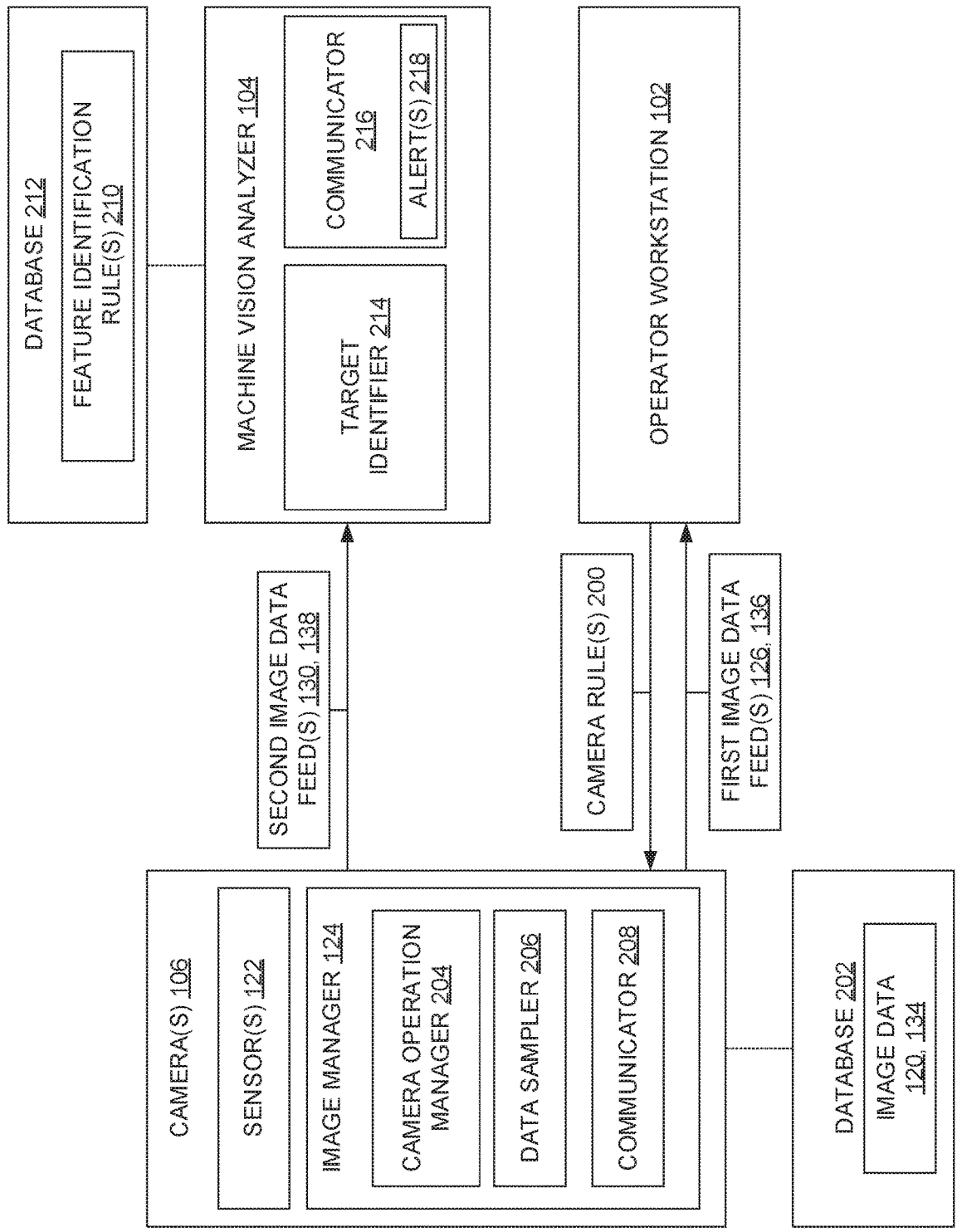
FIG. 2 is a block diagram of an example implementation of the image manager and the machine vision analyzer of FIG. 1.

FIG. 2 is a block diagram of an example implementation of the example system 100 of FIG. 1. The camera(s) 106 of this example (e.g., co-bore sighted cameras supported by the camera turret 105 of FIG. 1) are in communication with the example operator workstation 102 via one or more wired or wireless connections. The example camera(s) 106 receive one or more user-defined camera rules 200 from the operator workstation 102. Based on the camera rule(s) 200, the camera(s) 106 generate image data for one or more portions of the environment 108, such as the first area 121 and/or the second area 132 of the environment 108 of FIG. 1. The camera rule(s) 200 can include rules with respect to an area of the environment 108 that one or more of the camera(s) 106 are to maintain in view when generating the image data, such as the area of the environment 108 including the first vehicle 118 as part of the search pattern. The camera rule(s) 200 can include rule(s) with respect to movement (e.g., rotation) of the camera(s) 106 to capture portion(s) of the environment 108, such as a degree to which by which the camera(s) 106 (e.g., camera lens) are to rotate to execute a search pattern. The camera rule(s) 106 can include rule(s) with respect to zoom levels, resolution levels, frame sizes, image type, etc. that are to be captured by the camera(s) 106 in generating the image data 120, 134, the first data feed(s) 126, 136 (i.e., the image data transmitted to the operator workstation 102), and/or the second data feed(s) 130, 138 of the image data 120, 134 (i.e., the image data transmitted to the machine vision analyzer 104). For example, the camera rule(s) 200 can indicate that the first data feed(s) 126, 136 are to be transmitted to the operator workstation in standard definition (e.g., 640×480 pixels). The camera rule(s) 200 can indicate that the second data feed(s) 130, 138 are to be transmitted to the machine vision analyzer 104 at a higher resolution (e.g., 1280×720 pixels).

The camera rule(s) 200 are stored in a database 202. In some examples, the image manager 124 includes the database 202. In other examples, the database 202 is located external to the image manager 124 in a location accessible to the image manager 124 as shown in FIG. 2.

The example image manager 124 of FIG. 2 includes a camera operation manager 204. The camera operation manager 204 controls activation of the camera(s) 106 based on the camera rule(s) 200. For instance, in examples in which the example system 100 includes two or more cameras including a still camera and a video camera (as part of the same turret camera or separate), the camera operation manager 204 selectively activates the cameras 106 to generate data based on the rule(s) 200 indicating the type of data to be collected. The camera operation manager 204 controls the position of the camera(s) 106 (e.g., the camera lens) based on the camera rule(s) 200 to enable the camera(s) 106 to generate image data for particular area(s) of the environment 108. For example, the camera operation manager 204 generates instructions to cause the camera(s) 106 to rotate (e.g., via a gimbal) based on a camera rule 200 indicating a degree to which the camera 106 is to rotate. In some examples, the camera operation manager 204 generates instructions to cause the camera(s) 106 to adjust a zoom level of the lens based on the rule(s) 200 to adjust an angle of the field of view of the camera(s) 106 (e.g., from 31.5 degrees to 1.5 degrees).

As discussed above, the sensor(s) 122 of the camera(s) 106 generate the image data 120, 134 for the environment 108 of FIG. 1. The image data 120, 134 can be stored in the database 202. The example image manager 124 of FIG. 2 includes a data sampler 206. The data sampler 206 samples the image data 120, 134 generated by the camera(s) 106 to generate the first image data feed 126, 136 for transmission to the operator workstation 102 and the second image data feed 130, 138 for transmission to the machine vision analyzer 104. For example, the data sampler 206 samples the image data 120, 134 to generate the first image data feed 126, 136 corresponding to a standard definition video having a resolution of 640×480 pixels. The data sampler 206 samples the image data 120, 134 to generate the second image data feed 130, 138 having one or more of higher resolution(s), different field(s) of view, different image format(s), etc. as compared to the first image data feed 126, 136 transmitted to the operator workstation 102. The data sampler 206 can sample the image data 120, 134 to generate the respective first and second image data feeds 126, 130, 136, 138 by alternatingly sampling the image data 120, 134 during sampling intervals. The sampling of the image data 120, 134 can be based on the camera rule(s) 200 defining sampling rates, resolutions, etc.

The example image manager 124 includes a communicator 208. As illustrated in FIG. 2, the communicator 208 transmits the first image data feed 126, 136 to the operator workstation 102 and the second image data feed 130, 138 to the machine vision analyzer 104. The communicator 208 can transmit the respective data feeds 126, 130, 136, 138 to the operator workstation 102 and the machine vision analyzer 104 based on the camera rule(s) 200 defining a frequency at which the data is to be transmitted (e.g., within two seconds of the image data being generated, after the camera(s) 106 are done collecting data for the surveillance period, etc.).

As disclosed above, the first image data feed 126, 136 is received at the operator workstation 102. The first image data feed 126, 136 is stored at the operator workstation 102 (e.g., in a database) for access and analysis by a user.

As also disclosed above, the example machine vision analyzer 104 analyzes the second image data feed 130, 138 using machine vision algorithms and feature identification analysis. The machine vision analyzer 104 performs the feature identification analysis using user-defined feature identification rule(s) 210. The feature identification rule(s) 210 can be based on facial recognition algorithm(s) and/or object recognition algorithm(s) for subject matter of interest, such as a person and/or vehicle under surveillance. The feature identification rule(s) 210 are stored in a database 212. In some examples, the machine vision analyzer 104 includes the database 212. In other examples, the database 212 is located external to the machine vision analyzer 104 in a location accessible to the machine vision analyzer 104 as shown in FIG. 2.

The example machine vision analyzer 104 of FIG. 2 includes a target identifier 214. The target identifier 214 analyzes the second image data feed 130, 138 based on the feature identification rule(s) 210 and machine vision algorithm(s) to determine if the subject matter of interest is represented in the second image data feed 130, 138. The image data from the second image data feed 130, 138 can be stored in the database 212.

In some examples, the second image data feed 130, 138 includes image data for at least of the same portions of the environment 108 that is included in the first image data feed 126, 136, such as images of the first vehicle 118 in FIG. 1 in overlapping fields of view. Thus, in some examples, image data for portion(s) of the environment 108 are analyzed by both the user and the machine vision analyzer 104. In such examples, the machine vision analyzer 104 can serve to supplement or confirm the analysis of the first image data feed by the user. In examples in which the second image data feed 130, 138 includes higher resolution data or image data with increased detail levels as compared to the first image data feed 126, 136, the machine vision analyzer 104 can detect subject matter of interest that may be missed by the user or can be used by the user for confirmation of the presence or absence of a point of interest.

The example machine vision analyzer 104 of FIG. 2 includes a communicator 216. In some examples, if the target identifier 214 of the machine vision analyzer 104 identifies the subject matter of interest in the second image data feed 130, 138 based on the feature identification rule(s) 210, the communicator 216 generates one or more alerts 218. The alert(s) 218 can be transmitted to a user (e.g., the user of the operator workstation 102, a different user) and/or stored in the database 212 for access by a user at a later time. The alert(s) 218 can include, for instance, a portion of the second image data feed 130, 138 (e.g., a frame) in which the target identifier 214 detected the subject matter of interest.

While an example manner of implementing the example image manager 124 of FIG. 1 is illustrated in FIG. 2, one or more of the elements, processes and/or devices illustrated in FIG. 2 may be combined, divided, re-arranged, omitted, eliminated and/or implemented in any other way. Further, the example database 202, the example camera operation manager 204, the example data sampler 206, the example communicator 208, and/or, more generally, the example image manager 124 of FIG. 2 may be implemented by hardware, software, firmware and/or any combination of hardware, software and/or firmware. Thus, for example, any of the example database 202, the example camera operation manager 204, the example data sampler 206, the example communicator 208, and/or, more generally, the example image manager 124 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 202, the example camera operation manager 204, the example data sampler 206, the example communicator 208 is/are hereby expressly defined to include a non-transitory computer readable storage device or storage disk such as a memory, a digital versatile disk (DVD), a compact disk (CD), a Blu-ray disk, etc. including the software and/or firmware. Further still, the example image manager 124 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Also, while an example manner of implementing the example machine vision analyzer 104 of FIG. 1 is illustrated in FIG. 2, one or more of the elements, processes and/or devices illustrated in FIG. 2 may be combined, divided, re-arranged, omitted, eliminated and/or implemented in any other way. Further, the example database 212, the example target identifier 214, the example communicator 216, and/or, more generally, the example machine vision analyzer 104 of FIG. 2 may be implemented by hardware, software, firmware and/or any combination of hardware, software and/or firmware. Thus, for example, any of the example database 212, the example target identifier 214, the example communicator 216, and/or, more generally, the example machine vision analyzer 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 212, the example target identifier 214, the example communicator 216 is/are hereby expressly defined to include a non-transitory computer readable storage device or storage disk such as a memory, a digital versatile disk (DVD), a compact disk (CD), a Blu-ray disk, etc. including the software and/or firmware. Further still, the example machine vision analyzer 104 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events As discussed above, the camera(s) 106 of the example system 100 of FIGS. 1 and 2 (e.g., two or more co-bore sighted cameras 106 coupled to the camera turret 105) can generate image data for one or more portions of the environment 108, including changing the field of view from which the image data is collected (e.g., the first area 121 of FIG. 1 and the second area 132 of FIG. 1). FIGS. 3-12 illustrate additional examples of image data generated by the camera(s) 106 and selectively transmitted to the operator workstation 102 or the machine vision analyzer 104. In some examples, the camera(s) 106 includes two or more cameras capable of capturing different formats of image data (e.g., video versus still image) and/or image data with different features (e.g., pixel size, detail level) based on differences in telescoping lenses, image sensors, etc. between the cameras. As mentioned above, the cameras can be co-boresighted such that the cameras provide image data for the portion(s) of the environment with different image data features and/or using different image sensors. The backplane associated with the cameras can be selectively sampled to generate the different image data.

Figure 3:
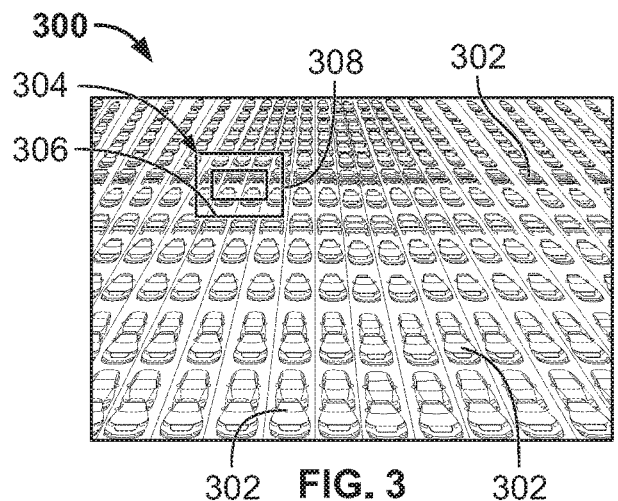
FIGS. 3-11 depict example image data generated in accordance with teachings disclosed herein.
Figure 4:
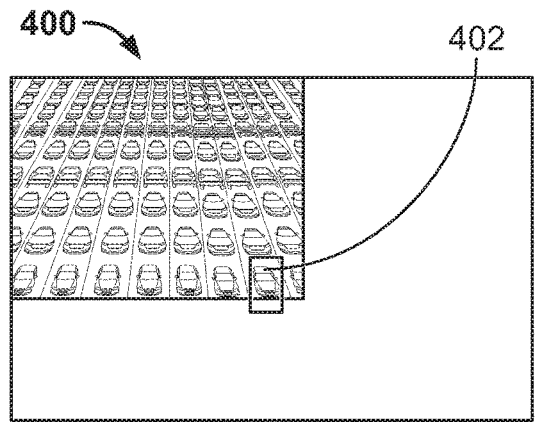

FIG. 3 illustrates a parking lot 300 including a plurality of vehicles 302. FIG. 4 illustrates image data 400 of the parking lot 300 transmitted to the operator workstation 102 (e.g., via the first image data feed 126, 136 of FIGS. 1 and 2), where the image data 400 includes an image of a first vehicle 402 under surveillance. The image data 400 of FIG. 4 can be low resolution video data captured in standard format by a first camera. FIG. 3 includes zoomed image data 304 generated by a second, high resolution camera with a telescopic lens to zoom in and capture detail of vehicles 302 in the parking lot 300 at a level not shown in the image data 400 of FIG. 4. The zoomed image data 304 can include multiple frames at different zoom levels as represented by the dashed boxes 306, 308 in FIG. 3. In the example of FIG. 3, the zoomed image data 304 is analyzed by the machine vision analyzer 104.

Figure 5:
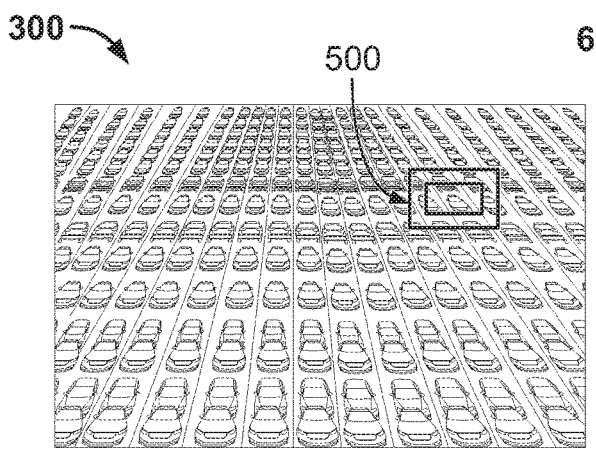
Figure 6:
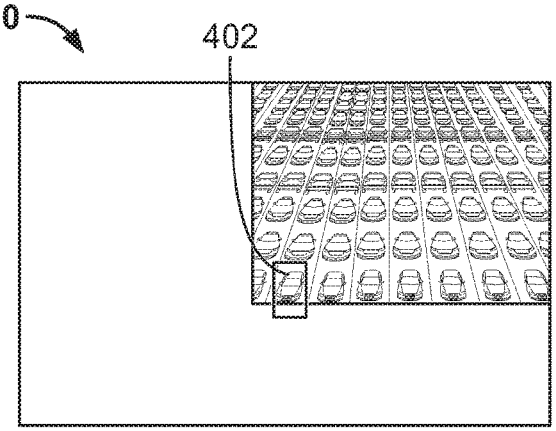

FIG. 5 shows the same parking lot 300 of FIG. 3 but includes different zoomed image data 500 (e.g., still image data) that can be captured by, for instance, a high resolution camera, and transmitted to the machine vision analyzer 104. FIG. 6 illustrates a low resolution and/or standard definition image data 600 (e.g., video) transmitted to the operator workstation 102 including the first vehicle 402 under surveillance. As compared to FIG. 4, the image data 600 of FIG. 6 shows a different portion of the parking lot 300. However, both the image data 400 of FIG. 4 and the image data 600 of FIG. 6 include the first vehicle 402 to enable the user to monitor the first vehicle 402 while viewing other areas of the parking lot 300 as part of the search pattern.

The different fields of view captured by the camera(s) 106 in FIGS. 3-5 can be based on the camera rule(s) 200 defining a search pattern with respect to, for example, the first vehicle 402 under surveillance. The camera rule(s) 200 can define a search pattern with respect to the vehicles that should be kept in view as the camera(s) move (e.g., the first vehicle 402) and other areas of the parking lot for which image data should be generated. The camera rule(s) 200 can also define the search pattern with respect to the image frame size for the different views, zoom level, image format type, etc.

Figure 7:
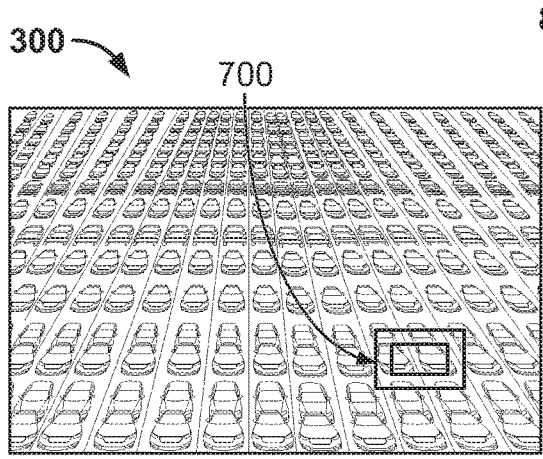
Figure 8:
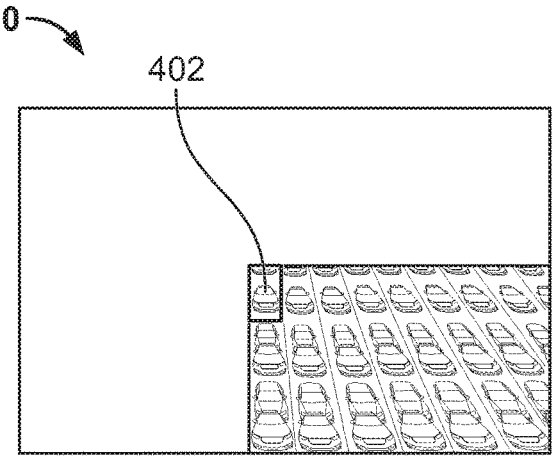
Figure 9:
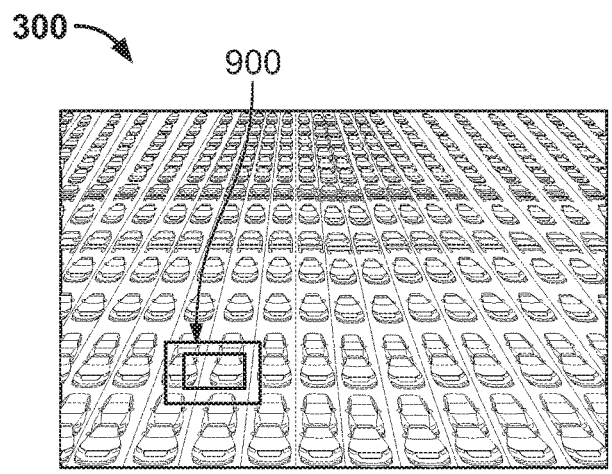
Figure 10:
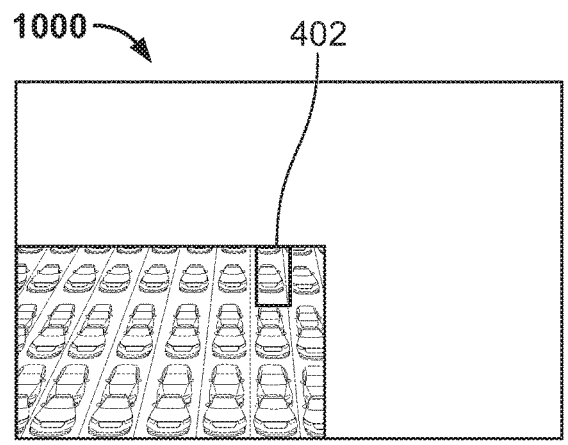

FIGS. 7-10 illustrate additional image data that can be generated to capture different fields of view and/or details of the parking lot 300. FIGS. 7 and 9 show respective zoomed image data 700, 900 that can be captured in high resolution and transmitted to the machine vision analyzer 104 for automated feature detection analysis. FIGS. 8 and 10 illustrate lower resolution and/or standard definition image data 800, 1000 transmitted to the operator workstation 102 including the first vehicle 402 under surveillance.

Figure 11:
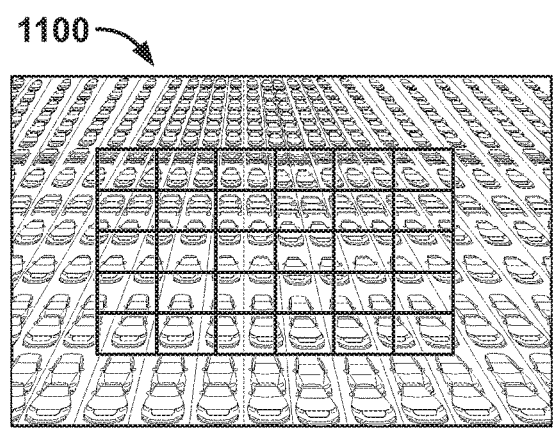

FIG. 11 illustrates a mosaic 1100 showing the area of the parking lot 300 represented by the zoomed image data of FIGS. 3, 5, 7, and 9 captured by the high resolution camera(s) 106. As compared to the low resolution and/or standard definition image data 400, 600, 800 of FIGS. 4, 6, and 8, the zoomed-in image data generated by the high resolution camera(s) 106 capture a greater level of detail of the parking lot 300 and the vehicles 302 than if the low resolution and/or standard definition image data 400, 600, 800 of FIGS. 4, 6, and 8 was analyzed by the user alone. Thus, examples disclosed herein provide for enhanced image analysis by generating data feeds having different image features (e.g. resolution, zoom level, area of the environment captured, etc.) and transmitting those data feeds for analysis by a user and the machine vision analyzer 104, thereby increasing the amount of image data analyzed and/or the parameters of the analysis performed (e.g., detail level, field of view) as compared to if the data was analyzed by the user alone.

As mentioned above, although examples disclosed herein are discussed in the context of surveillance, the teachings disclosed herein can be implemented in connection with other applications, such as navigation. For example, the camera(s) 106 disposed in an environment (e.g., throughout a city) can be used to generate image data that is sampled and analyzed by one or more of the operator workstation 102 and the machine vision analyzer 104 to identify a location of a person who is to receive a package delivered via a drone at a particular time. Based on the identification of the location of the person expecting the package, a drone can deliver the package to the person using navigational data obtained as result of the location identification of the person in the environment. In some examples, the camera(s) 106 can be carried by an aircraft vehicle such as the drone. In such examples, one camera 106 may be used to generate the image data and sample the first and second data feeds reduce a weigh carried by the drone. Thus, examples disclosed herein can be used to generate temporal and/or geospatial information based on the image data that can then be used, for instance, for navigation purposes.

Figure 12:
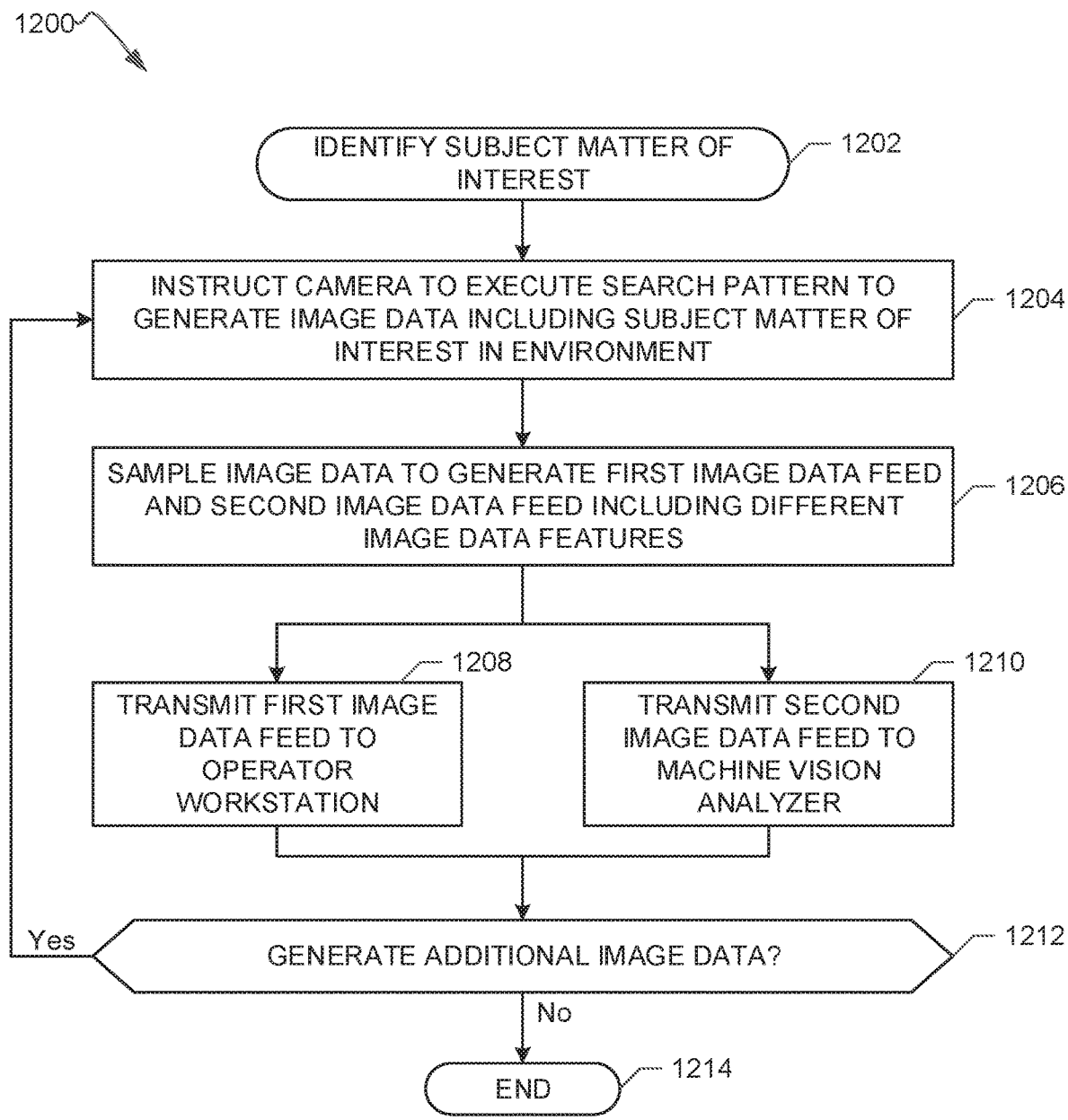
FIG. 12 is a flowchart representative of example machine readable instructions which may be executed to implement the example image manager of FIGS. 1 and 2.

FIG. 12 is a flowchart of an example method 1200 for selectively generating image data feeds for analysis by a user and a machine vision analyzer (e.g., the machine vision analyzer 104 of FIGS. 1 and 2). The example method 1200 of FIG. 12 can be implemented by the example image manager 124 of FIGS. 1 and 2.

In the example method 1200, subject matter of interest is identified by, for example, a user (e.g., a law enforcement official) (block 1202). In some examples, the subject matter of interest may be automatically identified by, for example, the operator workstation 102 (e.g., a computer) and/or the machine vision analyzer 104 based on feature identification analysis.

The example method 1200 includes instructing a camera to execute a search pattern to generate image data including the subject matter of interest in an environment (block 1204). For example, based on the camera rule(s) 200 identifying area(s) of the environment 108 for which image data is to be generated, the camera operation manager 204 of the example image manager 124 of FIGS. 1 and 2 instructs the camera 106 to move (e.g., rotate) and/or adjust a camera setting (e.g., a zoom level, a frame size) to generate the image data 120 of the environment 108 including the first vehicle 118 under surveillance. The camera rule(s) 200 can define the area(s) of the environment 108 for which image data is to be generated based on, for instance, the presence or expected presence of the subject matter of interest in the area(s). The image data 120 is captured by a backplane of the camera 106.

The example method 1200 includes sampling image data to generate a first image data feed and a second image data feed including different image data features (block 1206). For example, the data sampler 206 of the example image manager 124 samples the image data 120 of FIG. 1 captured by the camera backplane to generate the first image data feed 126 including standard definition image data of the first vehicle 118. The data sampler 206 samples the image data 120 of FIG. 1 captured by the camera backplane to generate the second image data feed 130 including high resolution image data of, for instance, the area 121 and/or a portion thereof including the first vehicle 118, the street 114, the building 116, etc. The data sampler 206 samples the data based on the camera rule(s) 200 defining, for instance, sampling rates, resolution for each image data feed, etc.

The example method 1200 includes transmitting the first image data feed to an operator workstation or a computer accessed by a user (block 1208) and transmitting the second image data feed to a machine vision analyzer (block 1210). For example, the communicator 208 of the example image manager 124 transmits the first image data feed 126 to the operator workstation 102 via one or more wired or wireless communication protocols. Also, the communicator 208 transmits the second image data feed 130 to the machine vision analyzer 104 via one or more wired or wireless communication protocols. The frequency at which the communicator 208 transmits the data feeds 126, 130 to the respective operator workstation 102 and the machine vision analyzer 104 can be defined based on the camera rule(s) 200.

In the example method 1200, if additional image data is to be generated (block 1212), the example method 1200 returns to instructing the camera to execute the search pattern to generate the additional image data (block 1204). For example, the camera operation manager 204 can instruct the camera 106 to move (e.g., rotate, pan) to generate image data for the second area 132 of the environment 108 including the first vehicle 118 under surveillance. The additional image data can be sampled to generate the image data feeds 136, 138 for transmission to the operator workstation 102 and the machine vision analyzer 104, where the image data feed 136 transmitted to the operator workstation 102 continues to provide the user with a view of the first vehicle 118 (blocks 1206-1210). The example method ends when no further image data is to be obtained (block 1214).

Figure 13:
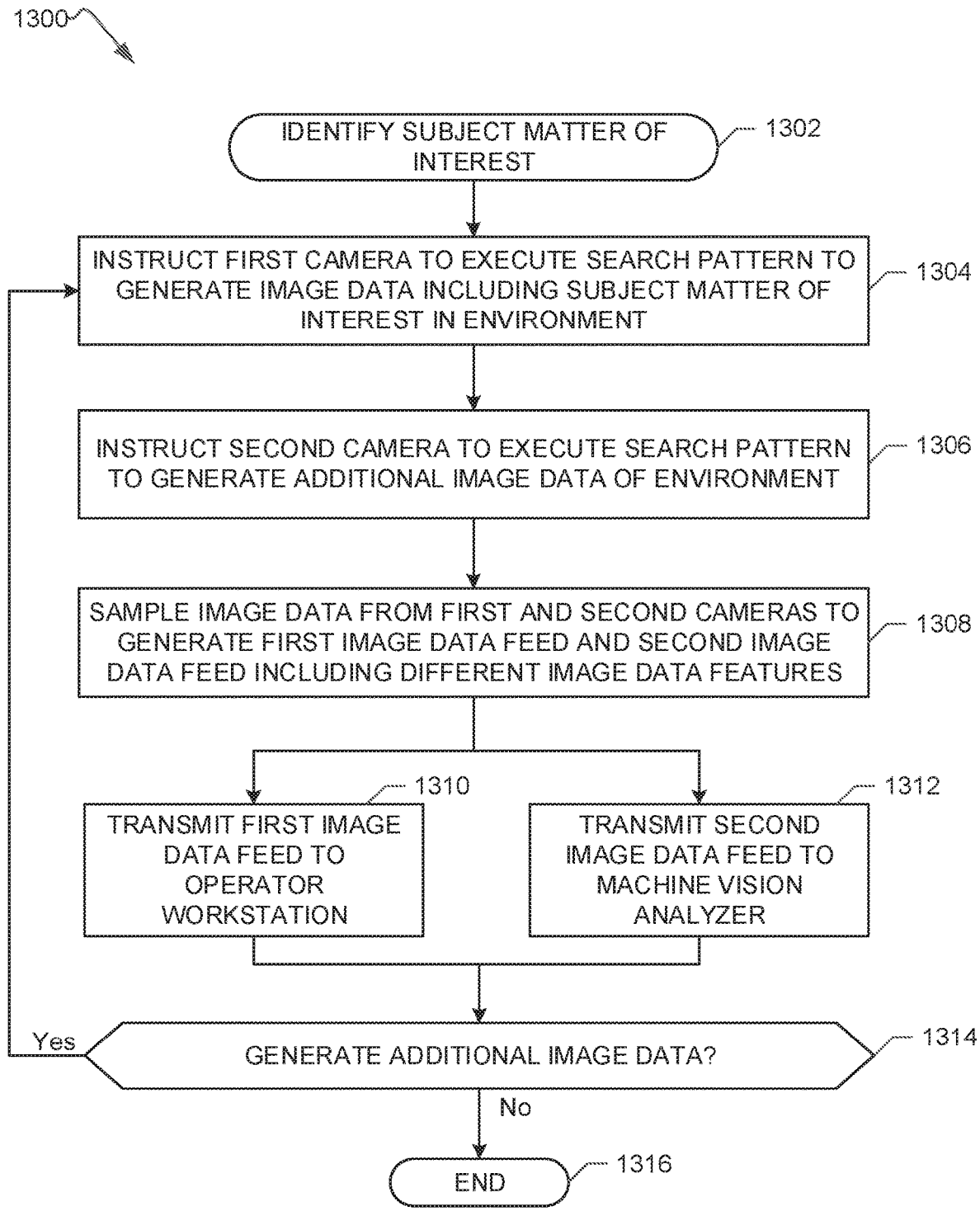
FIG. 13 is another flowchart representative of example machine readable instructions which may be executed to implement the example image manager of FIGS. 1 and 2.

FIG. 13 is a flowchart of an example method 1300 for selectively generating image data feeds for analysis by a user and a machine vision analyzer (e.g., the machine vision analyzer 104 of FIGS. 1 and 2) using two or more cameras (e.g., the co-bore sighted camera(s) 106 of FIGS. 1 and 2). The example method 1300 of FIG. 13 can be implemented by the example image manager 124 of FIGS. 1 and 2. The cameras can include, for example, a turret camera supporting multiple cameras such as a video camera and a still image camera.

In the example method 1300, subject matter of interest is identified by, for example, a user (e.g., a law enforcement official) (block 1302). In some examples, the subject matter of interest may be automatically identified by, for example, the operator workstation 102 (e.g., a computer) and/or the machine vision analyzer 104 based on feature identification analysis.

The example method 1300 includes instructing a first camera to execute a search pattern to generate image data including the subject matter of interest in an environment (block 1304). For example, based on the camera rule(s) 200 identifying area(s) of the environment 108 for which image data is to be generated, the camera operation manager 204 of the example image manager 124 of FIGS. 1 and 2 instructs a first one of the cameras 106 (e.g., a video camera) to move (e.g., rotate) and/or adjust a camera setting (e.g., a zoom level, a frame size) to generate the image data 120 of the environment 108 including the first vehicle 118 under surveillance. The camera rule(s) 200 can define the area(s) of the environment 108 for which image data is to be generated based on, for instance, the presence or expected presence of the subject matter of interest in the area(s).

The example method 1300 includes instructing a second camera to execute a search pattern to generate additional image data of the environment, which may or may not include the subject matter of interest (block 1306). For example, based on the camera rule(s) 200, the camera operation manager 204 instructs a second one of the cameras 106 (e.g., a still camera) to generate image data of the environment 108. The image data generated by the second camera can include different fields of view of the environment, zoom levels, and/or image types than the image data generated by the first camera. For example, the image data generated by the second camera can include the zoomed image data 304, 500, 700, 900 of FIGS. 3, 5, 7, and 9.

The example method 1300 includes sampling image data generated by the first and second cameras (and captured by a camera backplane) to generate a first image data feed and a second image data feed including different image data features (block 1308). For example, the data sampler 206 of the example image manager 124 samples the low resolution video image data 400, 600, 800, 1000 of FIGS. 4, 6, 8, 10 to generate the first image data feed 126 of the first vehicle 118, 402 under surveillance. The data sampler 206 samples the high resolution zoomed image data 304, 500, 700, 900 of FIGS. 3, 5, 7, 9 to generate the second image data feed 130 having a greater detail level than the low resolution image data. The data sampler 206 samples the data based on the camera rule(s) 200 defining, for instance, sampling rates, resolution for each data feed, etc.

The example method 1300 includes transmitting the first image data feed to an operator workstation or a computer accessed by a user (block 1310) and transmitting the second image data feed to a machine vision analyzer (block 1312). For example, the communicator 208 of the example image manager 124 transmits the first image data feed 126 to the operator workstation 102 via one or more wired or wireless communication protocols. Also, the communicator 208 transmits the second image data feed 130 to the machine vision analyzer 104 via one or more wired or wireless communication protocols. The frequency at which the communicator 208 transmits the data feeds 126, 130 to the respective operator workstation 102 and the machine vision analyzer 104 can be defined based on the camera rule(s) 200.

In the example method 1300, if additional image data is to be generated (block 1314), the example method 1300 returns to instructing the first camera to execute the search pattern to generate the image data including the subject matter of interest in the environment and the second camera to generate additional image data of the environment (blocks 1304, 1306). For example, the camera operation manager 204 can instruct the first camera 106 to move (e.g., rotate, pan) to generate additional image data of the parking lot 300 of FIG. 3 from a different angle, while still maintaining the first vehicle 402 in the field of view. Also, the camera operation manager 204 can instruct the second camera 106 to generate zoomed image data for a different vehicle 302 in the parking lot 300 than for which data was previously collected. The additional image data can be sampled to generate the image data feeds 136, 138 for transmission to the operator workstation 102 and the machine vision analyzer 104. The example method ends when no further image data is to be obtained (block 1316).

The flowcharts of FIGS. 12 and 13 are representative of example hardware logic, machine readable instructions, hardware implemented state machines, and/or any combination thereof for implementing the example image manager 124 of FIGS. 1 and 2. The machine readable instructions may be an executable program or portion of an executable program for execution by a computer processor such as the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowcharts illustrated in FIGS. 12 and/or 13, many other methods of implementing the example image manager 124 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 14:
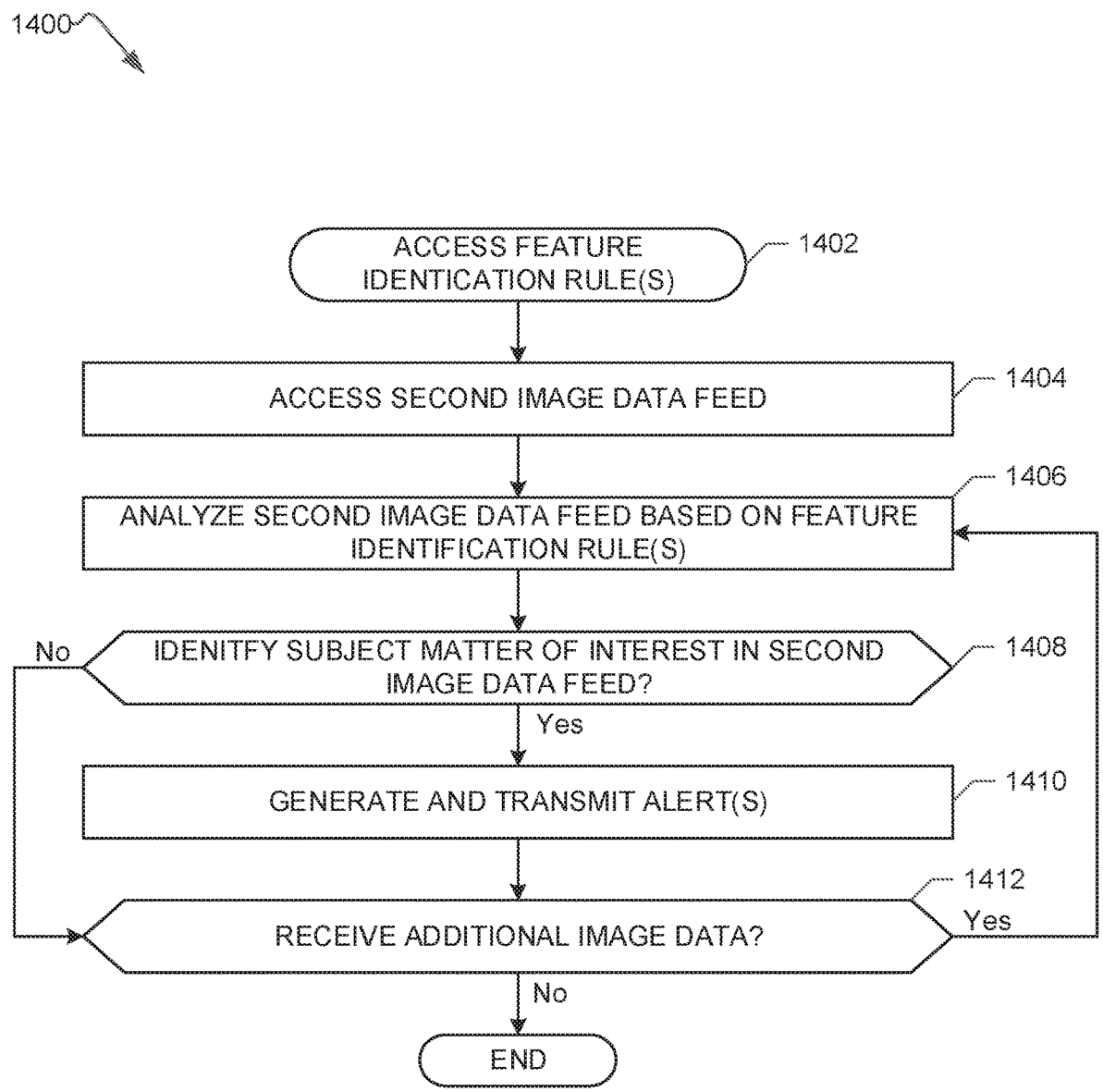
FIG. 14 is a flowchart representative of example machine readable instructions which may be executed to implement the example machine vision analyzer of FIGS. 1 and 2.

FIG. 14 is a flowchart of an example method 1400 for performing feature identification analysis based on an image data feed received from a camera (e.g., the second image data feed 130, 138 of FIGS. 1 and 3). The example method 1400 of FIG. 14 can be implemented by the example machine vision analyzer 104 of FIGS. 1 and 2.

The example method 1400 of FIG. 14 includes accessing feature identification rule(s) (block 1402). For example, user-defined feature identification rule(s) 210 can be transmitted to the machine vision analyzer 104 from the operator workstation 102 and stored in the database 212. The feature identification rule(s) 210 can include facial recognition rule(s) and/or object recognition rule(s) based on the subject matter of interest.

The example method 1400 includes accessing an image data feed (i.e., the second image data feed of FIGS. 12 and 13) (block 1404). For example, the machine vision analyzer 104 can access the second image data feed 130, 138 received from the image manager 124 of FIGS. 1 and 2 and stored in the database 212.

The example method 1400 includes analyzing the image data feed based on the feature identification rules (block 1406). For example, the target identifier 214 of the example machine vision analyzer 104 applies the feature identification rule(s) 210 (e.g., facial recognition analysis, object recognition analysis) and machine vision algorithms to analyze the second image data feed 130, 138 with respect to the subject matter of interest.

If the subject matter of interest is identified in the image data feed (block 1408), the example method 1400 includes generating alert(s) (block 1410). For example, the communicator 216 of the example machine vision analyzer 104 can generate the alert(s) 218 to alert the user that the subject matter of interest has been detected in the second image data feed 130, 138 based on the feature identification rule(s) 210. The example method 1400 ends when there is no further image data to analyze (block 1412).

The flowchart of FIG. 14 is representative of example hardware logic, machine readable instructions, hardware implemented state machines, and/or any combination thereof for implementing the machine vision analyzer 104 of FIGS. 1 and 2. The machine readable instructions may be an executable program or portion of an executable program for execution by a computer processor such as the processor 1612 shown in the example processor platform 1600 discussed below in connection with FIG. 16. The program may be embodied in software stored on a non-transitory computer readable storage medium such as a CD-ROM, a floppy disk, a hard drive, a DVD, a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowchart illustrated in FIG. 14, many other methods of implementing the example machine vision analyzer 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 12-14 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 15:
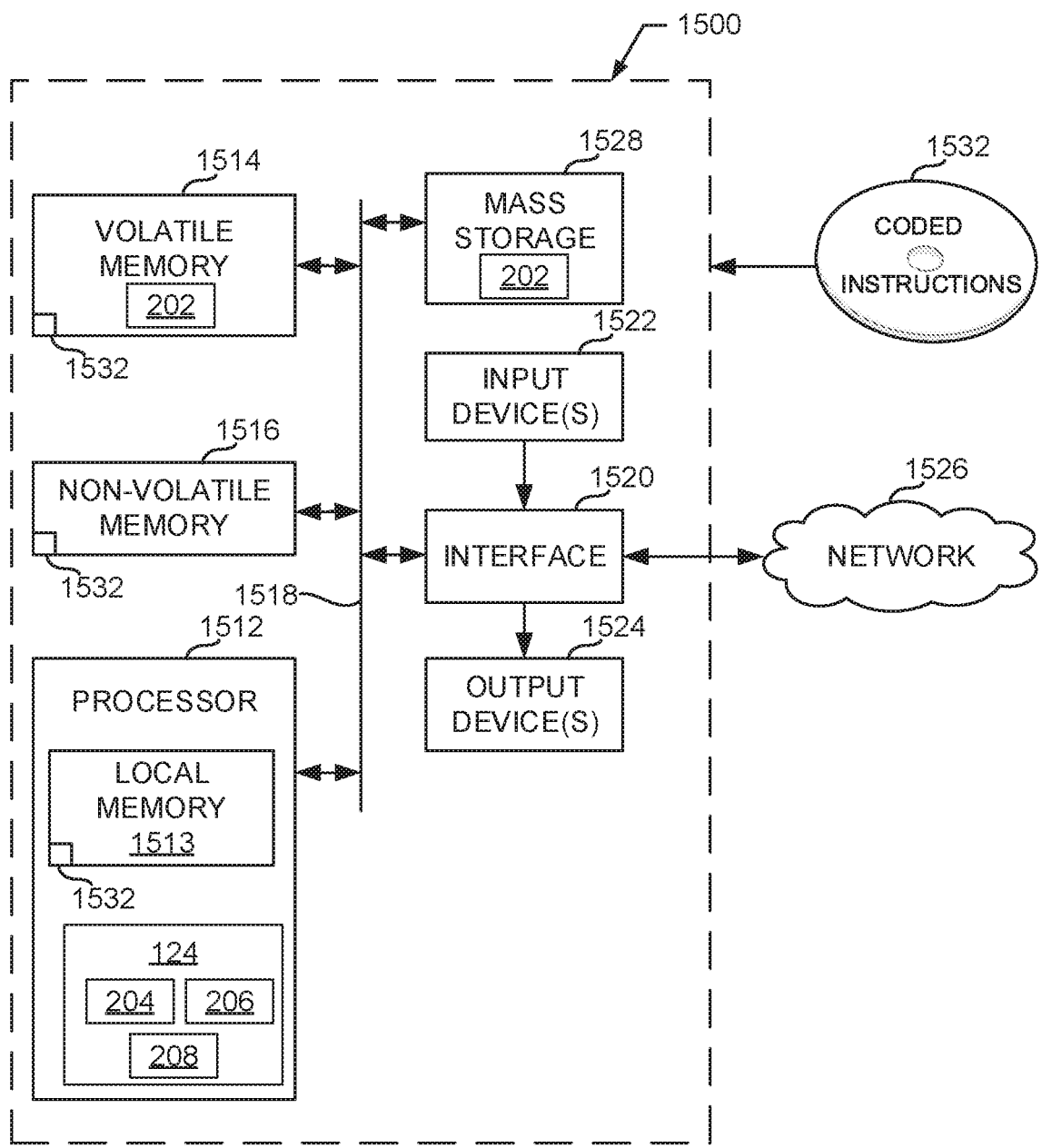
FIG. 15 is a block diagram of an example processing platform structured to execute the instructions of FIGS. 12 and/or 13 to implement the example image manager of FIGS. 1 and 2.

FIG. 15 is a block diagram of an example processor platform 1500 capable of executing instructions to implement the methods of FIGS. 12 and/or 13 and/or to implement the image manager 124 of FIGS. 1 and/or 2. The processor platform 1500 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a camera, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example camera operation manager 204, the example data sampler 206, and the example communicator 208.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

Coded instructions 1532 of FIG. 15 may be stored in the mass storage device 1528, in the volatile memory 1514, in the non-volatile memory 1516, and/or on a removable non-transitory computer readable storage medium such as a CD or DVD.

Figure 16:
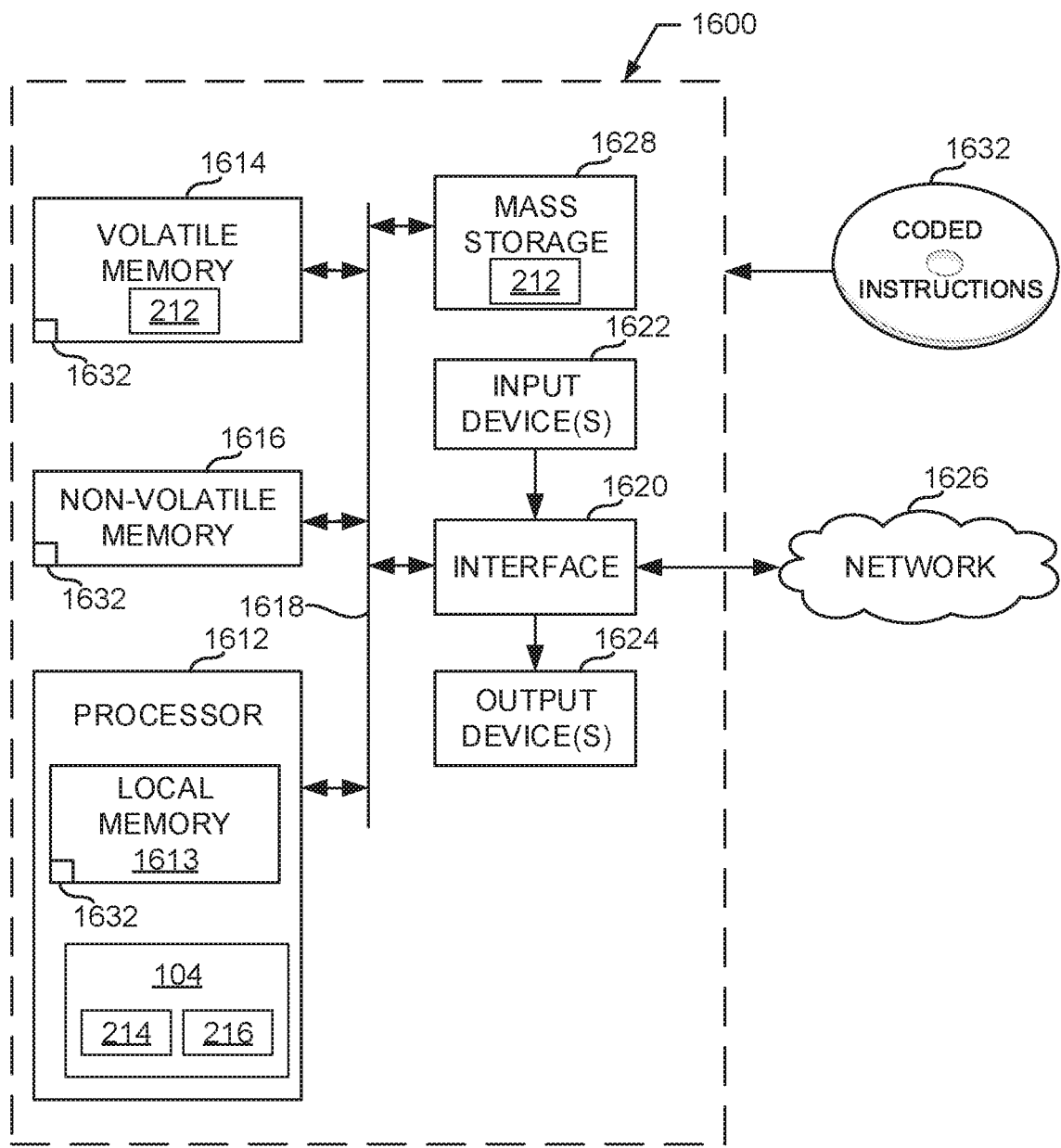
FIG. 16 is a block diagram of an example processing platform structured to execute the instructions of FIG. 14 to implement the example machine vision analyzer of FIGS. 1 and 2.

FIG. 16 is a block diagram of an example processor platform 1600 capable of executing instructions to implement the method of FIG. 14 and/or to implement the machine vision analyzer 104 of FIGS. 1 and/or 2. The processor platform 1600 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a camera, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example target identifier 214 and the example communicator 216.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives.

Coded instructions 1632 of FIG. 16 may be stored in the mass storage device 1628, in the volatile memory 1614, in the non-volatile memory 1616, and/or on a removable non-transitory computer readable storage medium such as a CD or DVD.

From the foregoing, it will be appreciated that example apparatus, methods, and systems have been disclosed that generate image data feeds based on image data of an environment and selectively transmit the data feeds for analysis by a user and a machine vision analyzer with respect to identifying and/or monitoring subject matter of interest in the environment. Examples disclosed herein maximize the amount of image data analyzed as compared to if the user was analyzing the image data alone to overcome computing limitations with respect to bandwidth transmissions and storage and/or processing capabilities as well as human-based limitations with respect to the ability of a user to review large amounts of data. In examples disclosed herein, image data feeds having higher resolutions and/or other different image data features (e.g., zoom levels, frame size) than the data feeds provided to the user are transmitted to a machine vision analyzer for automated analysis based on feature identification rules. Examples disclosed herein can be used to supplement the analysis performed by the user with machine vision analysis for a more complete review of the large amounts of image data generated by the cameras for purposes such as surveillance.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

An example apparatus disclosed herein includes a first camera coupled to a movable turret and a second camera coupled to the movable turret. The first camera and the second camera are co-bore sighted. The first camera and the second camera are to generate image data of an environment. The example apparatus includes a processor in communication with at least one of the first camera or the second camera. The processor is to generate a first image data feed based on the image data and a second image data feed based on the image data. The first image data feed includes a first image data feature and the second image data feed includes a second image data feature different than the first image data feature. The processor is to transmit the second image data feed for analysis by a machine vision analyzer.

In some examples, the processor is to transmit the first image data feed for analysis by a user.

In some examples, the first image data feature includes a first image resolution level and the second image data feature includes a second resolution level. The second resolution level is higher than the first resolution level.

In some examples, the first image data feature includes a first field of view of the environment and the second image data feature includes a second field of view of the environment different from the first field of view.

In some examples, the processor is to generate the first image data feed by sampling the image data at a first sampling rate. In some such examples, the processor is to generate the second image data during an interval between the sampling of the image data to generate the first image data feed.

In some examples, the first image data feed includes a first portion of the image data and the second image data feed includes a second portion of the image data. In some such examples, the second portion includes the first portion.

Another example apparatus disclosed herein includes a data sampler to sample image data generated by a camera for an environment; and generate a first image data feed and a second image data feed based on the sampling. The first image data feed includes a first image data feature and the second image data feed including a second image data feature different than the first image data feature. The example apparatus includes a communicator to selectively transmit the first image data feed to first analysis means and the second image data feed to second analysis means.

In some examples, the first analysis means includes analysis of the first image data feed by a user and the second analysis means includes automated analysis of the second image data feed based on a feature identification rule.

In some examples, the image data is first image data for a first portion of the environment and the example apparatus further includes a camera operation manager to cause the camera to generate second image data for a second portion of the environment. The data sampler is to sample the second image data to further generate the first image data feed and the second image data feed.

In some examples, the second image data includes at least a portion of the environment in the first image data.

In some examples, the feature image data feature includes a first image zoom level and the second image data feature includes a second image zoom level different from the first image zoom level.

In some examples, the first image data feed includes image data for a first portion of the environment and the second image data feed includes image data for a second portion of the environment.

Another example apparatus disclosed includes an image manager to generate a first image data feed based on image data generated by a camera for an environment and a second image data feed based on the image data. The first image data feed includes a first image data feature and the second image data feed includes a second image data feature different than the first image data feature. The image manager is to output the first image data feed via first communication channel and the second data feed via a second communication channel. The example apparatus includes a machine vision analyzer to identify subject matter in the environment based on a feature identification rule and the second image data feed.

In some examples, the feature identification rule includes one or more of a facial recognition rule or an object recognition rule.

In some examples, the image data is first image data and the image manager is to cause the camera to generate second image data for the environment. In such examples, at least a portion the first image data and at least a portion of the second image data includes a first area of the environment. In some such examples, the first image data feed is based on the portion of the first image data and the portion of the second image data including the first area of the environment.

In some examples, the image data is first image data and the image manager is to cause the camera to generate second image data for the environment. In such examples, the first image data is associated with a first field of view of the camera and the second image data associated with a second field of view of the camera different from the first field of view.

In some examples, the first image data feed includes video data and the second image data feed includes still image data.

An example method disclosed herein to enhance surveillance image analysis includes sampling, by executing an instruction with a processor, image data generated by a camera of an environment including a point of interest at a first sampling rate to generate first image data representing the point of interest, the first image data associated with a first image feature; sampling, by executing an instruction with a processor, the image data at a second sampling rate to generate a second image data associated with a second image data feature different than the first image data feature; and selectively transmitting, by executing an instruction with the processor, the first image data for analysis by a user and the second image data for analysis by a machine vision analyzer with respect to the point of interest.

In some examples, the sampling of the image data at the second sampling rate includes sampling the image data during an interval between the sampling of the image data at the first sampling rate.

In some examples, the first image feature includes a first resolution and the second image feature includes a second resolution higher than the first resolution.

In some examples, the first image feature includes a first zoom level relative to the point of interest and the second image feature includes a second zoom level relative to the point of interest.

In some examples, the first image data is associated with a first portion of the environment and the second image data is associated with a second portion of the environment.

In some examples, the image data is generated by a first camera coupled to a movable turret and a second camera coupled to the movable turret, the first camera and the second camera being co-bore sighted. In some such examples, the sampling of the image data at the first sampling rate includes sampling a first portion of the image data generated by a sensor backplane associated with the first camera and the second camera.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a first camera coupled to a movable turret and a second camera coupled to the movable turret, the first camera to generate first image data of an object of interest in an environment and the second camera to generate second image data of the object of interest in the environment, at least a portion of the environment in the first image data not in the second image data and at least a portion of the environment in the second image data not in the first image data, the first camera to maintain the object of interest in a field of view of the first camera during movement of the first camera about the movable turret to generate the first image data and the second camera to maintain the object of interest in a field of view of the second camera during movement of the second camera about the movable turret to generate the second image data; and
    a processor in communication with at least one of the first camera or the second camera, the processor to:
        alternatingly sample the first image data at a first sampling rate during first sampling intervals to generate a first image data feed and the second image data at a second sampling rate during second sampling intervals to generate a second image data feed, the first image data feed including a first image data feature and the second image data feed including a second image data feature, the second image data feature different than the first image data feature; and
        transmit the second image data feed for analysis by a machine vision analyzer.

2. The apparatus of claim 1, wherein the processor is to:
    transmit the first image data feed and not the second image data feed for presentation to a user; and
    transmit the second image data feed and not the first image data feed for analysis by the machine vision analyzer.

3. The apparatus of claim 1, wherein the first image data feature includes a first resolution level and the second image data feature includes a second resolution level, the second resolution level higher than the first resolution level.

4. The apparatus of claim 1, wherein the first image data feature includes a first field of view of the environment and the second image data feature includes a second field of view of the environment different from the first field of view, the object of interest in the first field of view and the second field of view.

5. An apparatus comprising:
    a data sampler to alternatingly sample (a) first image data generated by a first camera for an environment to generate a first image data feed having a first resolution during first sampling intervals and (b) second image data generated by a second camera for the environment to generate a second image data feed having a second resolution during second sampling intervals,
        the first image data feed including a first image data feature and the second image data feed including a second image data feature different than the first image data feature,
        the first image data feed including an object of interest captured in a first field of view of the first camera during movement of the first camera about a camera support to generate the first image data,
        the second image data feed including the object of interest captured in a second field of view of the second camera during movement of the second camera about the camera support to generate the second image data,
        a first portion of the environment in the first image data feed not in the second image data feed and a second portion of the environment in the second image data feed not in the first image data feed; and
    a communicator to:
        transmit the first image data feed and not the second image data feed via a first communication channel; and
        transmit the second image data feed and not the first image data feed via a second communication channel.

6. The apparatus of claim 5, wherein the communicator is to transmit the first image data feed for presentation to a user and transmit the second image data feed for automated analysis based on a feature identification rule.

7. The apparatus of claim 5, further including a camera operation manager to cause the first camera to generate the first image data to capture the first portion of the environment and to cause the second camera to generate the second image data to capture the second portion of the environment.

8. The apparatus of claim 7, wherein a third portion of the environment is in the first image data and the second image data.

9. The apparatus of claim 5, wherein the first image data feature includes a first image zoom level and the second image data feature includes a second image zoom level different from the first image zoom level.

10. An apparatus comprising:
    an image manager to:
        alternatingly sample (a) first image data generated by a first camera for an environment at a first sampling rate to generate a first image data feed and (b) second image data generated by a second camera for the environment at a second sampling rate to generate a second image data feed,
            the first image data feed including a first image data feature and the second image data feed including a second image data feature different than the first image data feature,
            the first image data feed including an object of interest captured in a first field of view of the first camera during movement of the first camera about a camera support to generate the first image data, the second image data feed including the object of interest captured in a second field of view of the second camera during movement of the second camera about the camera support to generate the second image data,
at least a first portion of the environment in the first image data feed not in the second image data feed and at least a second portion of the environment in the second image data feed not in the first image data feed; and
output the first image data feed via first communication channel and the second image data feed via a second communication channel; and
a machine vision analyzer to identify subject matter in the environment based on a feature identification rule and the second image data feed.

11. The apparatus of claim 10, wherein the feature identification rule includes one or more of a facial recognition rule or an object recognition rule.

12. The apparatus of claim 10, wherein the image manager is to cause the first camera to generate the first image data to capture the at least the first portion of the environment and to cause the second camera to generate the second image data to capture the at least the second portion of the environment.

13. The apparatus of claim 10, wherein the first image data feed includes video data and the second image data feed includes still image data.

14. The apparatus of claim 1, wherein the processor is to transmit the first image data feed via a first communication channel and the second image data feed via a second communication channel.

15. The apparatus of claim 10, wherein a resolution of the first image data feed is higher than a resolution of the second image data feed.

16. The apparatus of claim 1, wherein the first image data feed includes video data and the second image data feed includes still image data.

17. The apparatus of claim 10, wherein at least a third portion of the environment is in the first image data feed and the second image data feed.

18. The apparatus of claim 1, wherein the first image data feature includes a first image zoom level and the second image data feature includes a second image zoom level different from the first image zoom level.

19. The apparatus of claim 5, wherein a resolution of the first image data feed is higher than a resolution of the second image data feed.

20. The apparatus of claim 10, wherein the first image data feature includes a first image zoom level and the second image data feature includes a second image zoom level different from the first image zoom level.

* * * * *